United States Patent Office 3,623,322
Patented Nov. 30, 1971

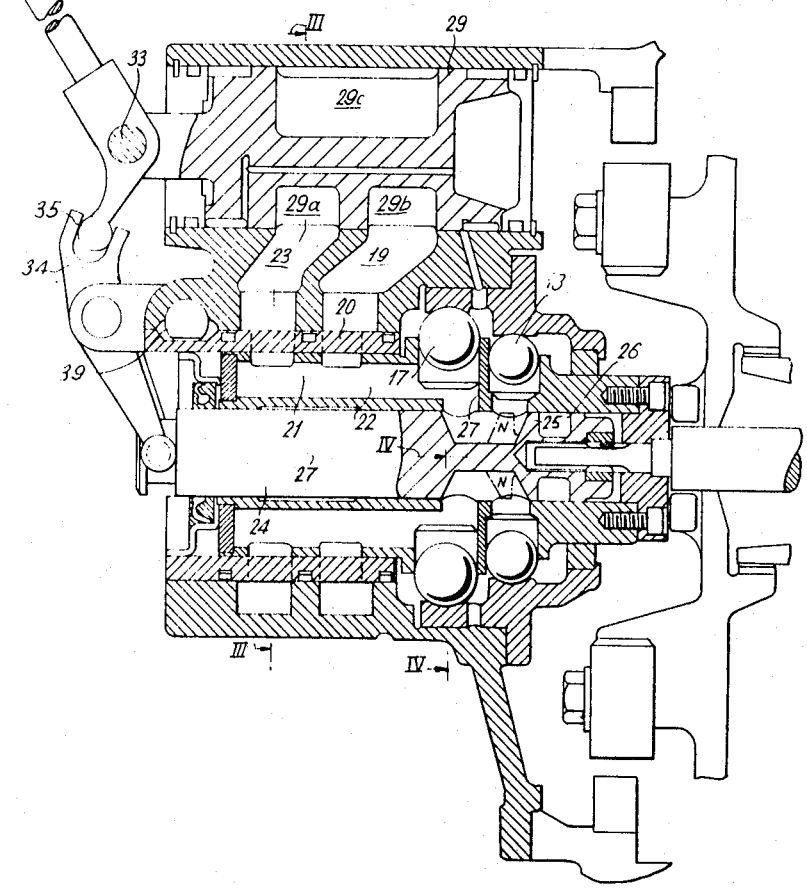

3,623,322
FLUID POWER TRANSMISSION SYSTEM
Roger Harvey Yorke Hancock, Glasgow, Scotland, assignor to National Research Development Corporation, London, SW., England
Filed Feb. 10, 1970, Ser. No. 9,677
Claims priority, application Great Britain, Feb. 11, 1969, 7,330/69
Int. Cl. F16d *31/02*
U.S. Cl. 60—53 R
13 Claims

ABSTRACT OF THE DISCLOSURE

A fluid power transmission system comprising a rotary ball pump having two rows of balls, and means to render inoperative one of the rows of balls so as to alter the pump output, in combination with a plurality of motors drivable by the pumped fluid, and means to couple the motors selectively to the pump output.

---

This invention relates to a fluid power transmission system.

More particularly the invention relates to a fluid power transmission system embodying a ball pump and a plurality of fluid operated motors.

An object of the invention is to provide a fluid power transmission system in which the equivalent of a number of gear ratios may be obtained by varying the pump output in steps and by varying the number of motors driven by the pump output.

According to the invention, a fluid power transmission system comprises a rotary ball pump having two rows of balls, and means to render inoperative one of the rows of balls so as to alter the pump output, in combination with a plurality of motors driven by the pumped fluid, and means to couple the motors selectively to the pump output.

Preferably the one row of balls is rendered inoperative by a valve which connects the inlets and outlets of each ball cylinder in the row via a short-circuiting passage so that the fluid does no effective work.

Preferably there are four motors so that one can be employed to drive each wheel in a four-wheel drive car. There is a fluid operated ball motor in each wheel and the pump pressurises the fluid to drive these ball motors. To get the equivalent of a four-speed gear box, the pump output is routed via a valve to feed all four wheels for the first two gear ratios and only two wheels for the third and fourth gear ratios. When two wheels are not being pump-driven, their motors are short-circuited by valve so that they pump from their inlets to their outlets. This last valve can be conveniently incorporated with that which selects the motors. The gears are as follows:

First gear: Pump on minimum capacity, valves arranged to feed all four-wheel motors.
Second gear: Pump on maximum capacity, valves arranged to feed all four-wheel motors.
Third gear: Pump on minimum capacity, valves arranged to feed only two-wheel motors.
Fourth gear: Pump on maximum capacity, valves arranged to feed only two-wheel motors.

A conventional gear lever with a conventional gate is arranged to operate the two different valves. One valve is a rotary distributor valve which distributes the output of the ball pump to either two wheels or four, and the other valve is an axially slidable change-over valve for changing the capacity of the pump.

This change-over valve has a neutral position in which the pump output is simply recirculated, so that no driving fluid is transmitted to the wheel motors.

Reverse is obtained by rotating a normally fixed valve sleeve through 90° by means of a rack and pinion which is not operated by the gear lever, but by a separate lever.

Figure 1:
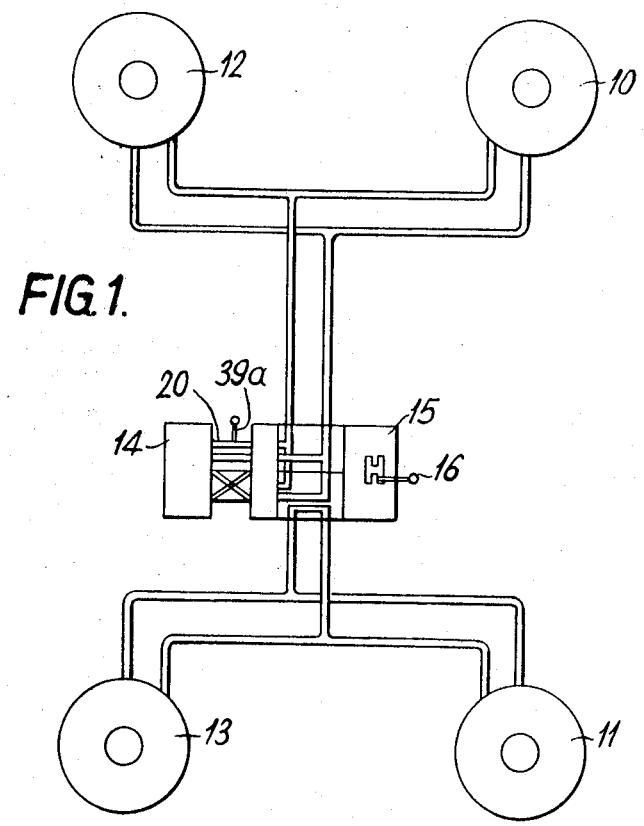
Figure 7:
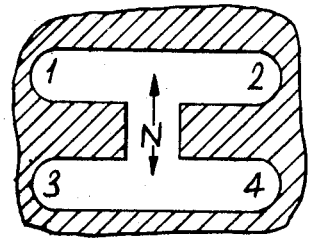
Figure 3:
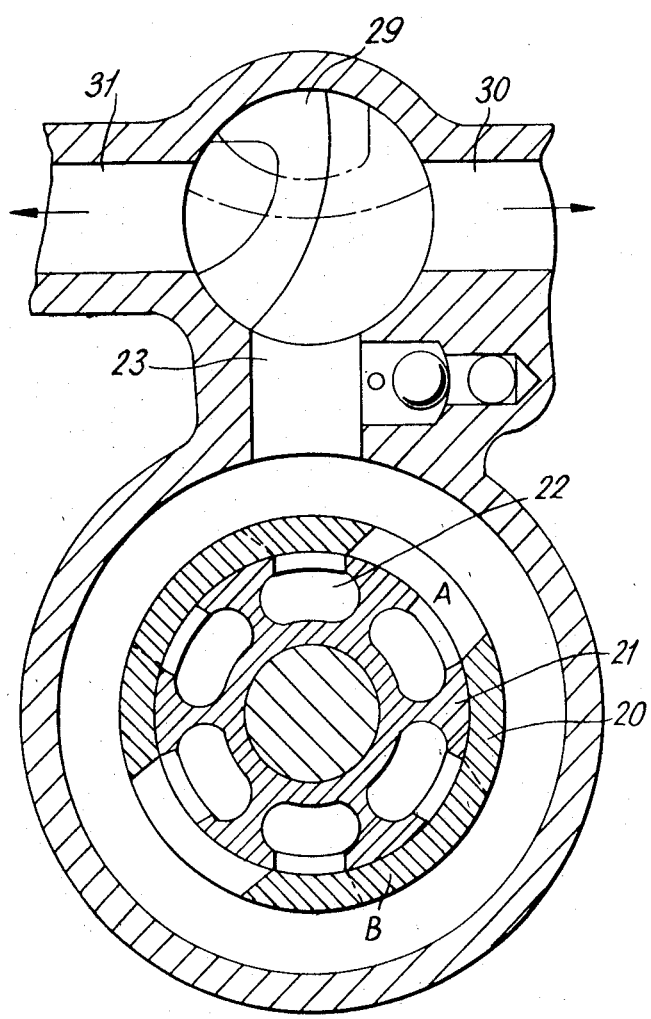
Figure 4:
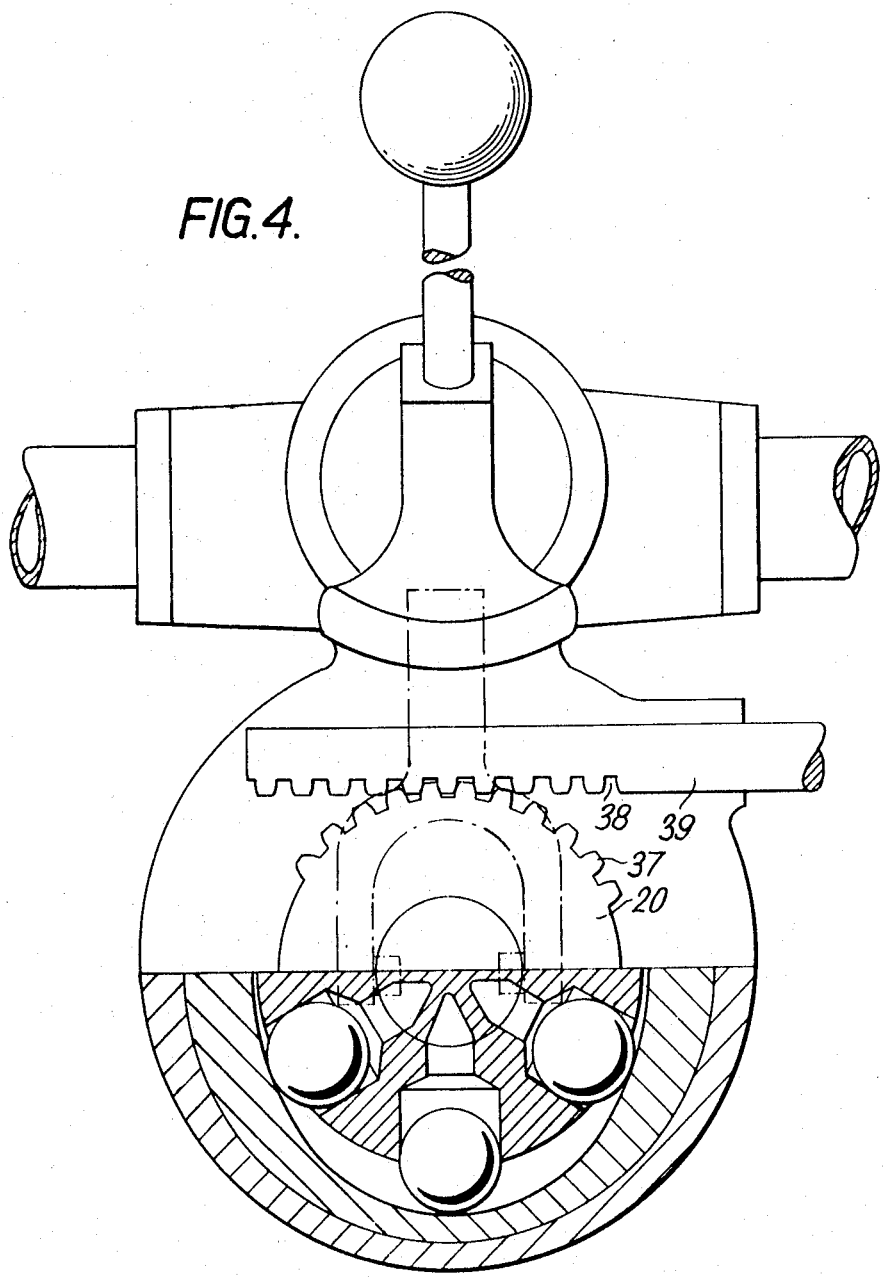
Figure 5:
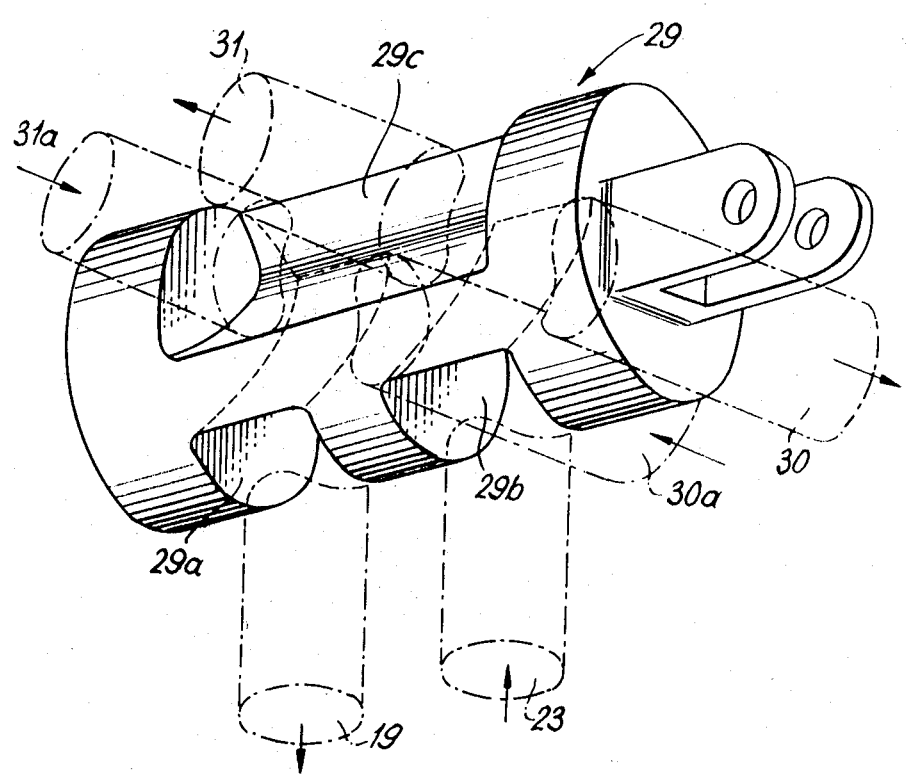
Figure 6:
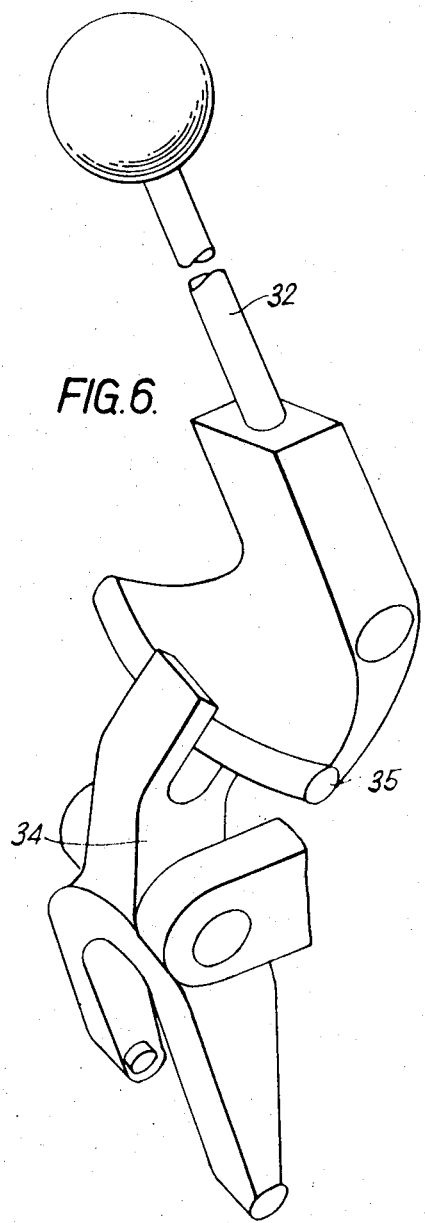

For a fuller understanding of the present invention, reference is now made by way of example to the accompanying drawings, in which:

FIG. 1 schematically illustrates a fluid power transmission system embodying the present invention,
FIG. 2 is a side elevation, partly in section, of a ball pump suitable for part of the transmission of FIG. 1,
FIG. 3 is a section on the line III—III shown in FIG. 2,
FIG. 4 is another section on the line IV—IV in FIG. 2,
FIG. 5 is a schematic "exploded" view of part of FIGS. 2 and 3,
FIG. 6 is a schematic view of part of FIGS. 2 and 4, and
FIG. 7 shows in more detail another part of the system of FIG. 1 as embodied in FIG. 2.

The basic system is shown in FIG. 1 of the accompanying drawings. There are four wheel motors 10, 11, 12 and 13 supplied by a two capacity pump 14, through a valve arrangement 15 under control of the gear lever 16. As shown either the two wheel motors 10 and 11 can be driven or all four wheel motors. When only two wheels are driven, the other two wheels have their motors shorted out. Reverse drive is afforded by way of a separate lever 39a which is effective to change over the fluid flow to and from the pump 14 by way of a valve 20.

Considering FIG. 2 with the associated sections of FIGS. 3 and 4, the pump is shown as a ball pump with two rows of balls 17 and 18. The flow to the pump may be regarded as coming from the wheel motors via an inlet channel marked 19, through an inlet port in a sleeve valve 20 and into a pintle 21, and thence through a common passage 22 in the pintle to both ball pump rows 17 and 18. The flow returns through the passage 22 and an outlet port in the sleeve valve 20 to an outlet channel 23. The capacity of the pump can be varied by moving an axially slidable valve 24. In the position shown in the drawing in firm line both rows of balls 18 and 17 are connected to the common passage 22, so that the full capacity of the pump is utilised. By sliding the valve 24 to the left as shown in FIG. 2, the valve land 25 can be put into the position shown in chain line which communicates both rows of balls with an annular passage 26 around which the work fluid will circulate, thus putting the pump into a neutral position, in which none of the wheel motors will be driven. By moving the valve 24 further to the left of the chain line showing of land 25, it can be brought into sealing relationship with the part marked 27. In this position the row of balls 18 is effectively inoperative since the fluid will pass round the annular passage 26, but the row of balls 17 is still operative to drive the wheel motors. It will be seen that the pump assembly rotates about an axis 27 and carries with it the pintle 21, the sleeve valve 20 being relatively fixed.

The supply of the fluid from the ball pump to the wheel motors is through a rotary distributor valve 29. This rotary valve in a schematic "exploded" perspective view with associated passages in FIG. 5; and FIG. 3 shows two positions of the valve, one in firm line and one in dotted line. In the firm line position of valve 29, fluid is supplied through the outlet passage 23, valve port 29a and a passage 30 to only one pair of wheel motors, while fluid returns from these motors through a passage 30a and a valve port 29b to the inlet passage 19. At the same time the supply passage 31 and associated return passage 31a for the other pair of wheel motors are blocked from access to the pump and short-circuited by valve port 29c.

When the valve 29 moves to the dotted line position shown in FIG. 3, port 29a connects passages 23, 30 and 31, port 29b connects passages 19, 30a and 31a, and port 29c is ineffective.

To enable the effective gear ratios produced by the combination of pump and valves to be selected manually with a conventional type of gear lever and conventional gate, the gear mechanism must be able to operate both the rotary distributor valve 29 and the axial valve 24. While the gear mechanism is shown in FIGS. 2 and 4, it is clarified by schematic perspective illustration in FIG. 6, and the associated gate is illustrated separately in FIG. 7.

The gear lever 32 is pivoted at 33 to the rotary distributor valve 29 for movement about an axis perpendicular to that of the valve so that the rotary distributor valve can be moved through 90° by the lever rotating relative to the valve. Below the pivot 33 the gear lever 32 is connected to another pivoted lever 34 by way of a ball and slot joint 35. The lower end of lever 34 is bifurcated and straddles the end of the valve 24 to which it is pivotally connected. Then, the gear lever can be moved about its pivot 33 to slide the axial valve 24 back and forth independently of the rotary valve 29.

Movement of the gear lever to the first gear position in gate will do two things: it will rotate the rotary distributor valve 29 so that the flow from the pump goes through all four wheel motors, and it will move the axial valve 24 so that the pump gives its minimum capacity. Movement of the lever 32 to the second gear position in the gate puts the pump into maximum capacity but maintains the flow to all four wheel motors. Movement of the lever to the third gear position rotates the distributor valve 29 through 90° so that only two of the wheel motors are driven, and puts the pump on its minimum capacity. Movement to the fourth gear position puts the pump on to its maximum capacity and maintains flow to two wheels only.

The neutral position N of the gear lever corresponds to the position of the land 25 of the axial valve 24 at which the pump is short circuited by the passage 26.

Reverse is selected by rotation of sleeve valve 20 by the mechanism shown in FIG. 4. The sleeve 20 has radial teeth 37 engaging teeth 38 on a rack 39. By moving the rack 39 the sleeve can be turned through 90° which reverses the flow to the wheel motors by reversing the normal respective association of the passages 19 and 23 with the induction and working phases of the pump.

With this arrangement a four-speed gear box is available for both forward and reverse motion of the vehicle.

There will normally need to be a clutch arrangement between the ball pump and its drive source, and in the present instance this is indicated as a centrifugal clutch at the right-hand side of FIG. 2, although other clutch arrangements may be employed.

While the invention has been more particularly described as providing a fluid power transmission system in which a ball pump drives a number of motors, the roles of the pump and motors are clearly interchangeable. Indeed in the above-described embodiment the pump does operate as a motor driven by the motors in a pump role if the associated vehicle over-runs.

I claim:

1. A fluid power transmission system comprising a rotary ball pump having two rows of balls, and means to render inoperative one of the rows of balls so as to alter the pump output, said means comprising a first valve operable to connect the inlets and outlets of each ball cylinder in said one row via a short-circuiting passage in combination with a plurality of motors drivable by the pumped fluid, and means to couple the motors selectively to the pump output.

2. A system according to claim 1 wherein said first valve is further operable to connect the inlets and outlets of each ball cylinder in the other row via said short-circuiting passage.

3. A system according to claim 1 wherein said first valve is a slide valve operable axially of the ball pump.

4. A system according to claim 1 comprising two motors, and wherein said means to couple comprises a second valve operable in one position to couple both of said motors to the pump output, operable in another position to couple one of said motors to the pump output and to short-circuit the other motor.

5. A system according to claim 4 wherein said second valve is a rotary valve having an axis of rotation parallel to that of said pump.

6. A system according to claim 1 wherein said means to render inoperative and said means to couple comprise a common control lever having two degrees of freedom in different ones of which said means are operable independently from each other.

7. A system according to claim 1 comprising another valve operable to reverse the pump output.

8. A system according to claim 7 wherein said pump comprises a common pintle co-axially rotatable with the pump and for communicating each ball cylinder of the pump with common inlet and outlet passages, and said other valve comprises a sleeve valve rotatable about said pintle between the pintle and said passages.

9. A fluid power transmission system comprising a rotary ball pump having two rows of balls, and means to render inoperative one of the rows of balls so as to alter the pump output, in combination with a plurality of motors drivable by the pumped fluid, and means to couple the motors selectively to the pump output; said means to couple comprising a valve operable in one position to couple both of said motors to the pump output, operable in another position to couple one of said motors to the pump output and to short-circuit the other motor.

10. A system according to claim 9 wherein said valve is a rotary valve having an axis of rotation parallel to that of said pump.

11. A fluid power transmission system comprising a rotary ball pump having two rows of balls, and means to render inoperative one of the rows of balls so as to alter the pump output, in combination with a plurality of motors drivable by the pumped fluid, and means to couple the motors selectively to the pump output; said means to render inoperative and said means to couple comprising a common control lever having two degrees of freedom in different ones of which said means are operable independently from each other.

12. A fluid power transmission system comprising a rotary ball pump having two rows of balls, and means to render inoperative one of the rows of balls so as to alter the pump output, in combination with a plurality of motors drivable by the pumped fluid, and means to couple the motors selectively to the pump output; and a valve operable to reverse the pump output.

13. A system according to claim 12 wherein said pump comprises a common pintle co-axially rotatable with the pump and for communicating each ball cylinder of the pump with common inlet and outlet passages, and said valve comprises a sleeve valve rotatable about said pintle between the pintle and said passages.

References Cited

UNITED STATES PATENTS

| | | | |
|---|---|---|---|
| 2,103,530 | 12/1937 | Henry | 60—52 R |
| 2,370,526 | 2/1945 | Doran | 60—53 C |
| 2,949,971 | 8/1960 | Cline | 180—66 X |
| 3,206,931 | 9/1965 | Wilson | 60—53 B |

EDGAR W. GEOGHEGAN, Primary Examiner

U.S. Cl. X.R.

60—53 B; 417—428; 91—492; 180—44 F